(12) United States Patent
Nakayama

(10) Patent No.: US 10,375,304 B2
(45) Date of Patent: Aug. 6, 2019

(54) IMAGE PROCESSING APPARATUS AND IMAGE PROCESSING METHOD

(71) Applicant: CANON KABUSHIKI KAISHA, Tokyo (JP)

(72) Inventor: Fumitaka Nakayama, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/124,934

(22) Filed: Sep. 7, 2018

(65) Prior Publication Data

US 2019/0082104 A1    Mar. 14, 2019

(30) Foreign Application Priority Data

Sep. 13, 2017 (JP) .................. 2017-175798

(51) Int. Cl.
*H04N 9/77* (2006.01)
*H04N 9/69* (2006.01)
*H04N 9/64* (2006.01)
*H04N 5/57* (2006.01)
*H04N 5/232* (2006.01)

(52) U.S. Cl.
CPC ......... *H04N 5/23232* (2013.01); *H04N 5/57* (2013.01); *H04N 9/646* (2013.01); *H04N 9/69* (2013.01); *H04N 9/77* (2013.01)

(58) Field of Classification Search
CPC ....................................................... H04N 9/78
See application file for complete search history.

(56) References Cited

FOREIGN PATENT DOCUMENTS

JP    3919389 B    5/2007

*Primary Examiner* — Paulos M Natnael
(74) *Attorney, Agent, or Firm* — Carter, DeLuca & Farrell LLP

(57) ABSTRACT

An apparatus has first and second generation units which generate, from input image data, color component data for luminance output and color component for color difference output, first and second convertors which converts tones of each piece of the color component data for luminance output and for color difference output, a combining unit combining each piece of the color component data obtained by the first and second convertors to generate respective pieces of combined color component data; a separation unit respectively separating luminance data and color difference data from the combined color component data; and a correction unit correcting a tone of each of the luminance data and color difference data. The second convertor has a characteristic for outputting a non-negative value in a range, of negative infinity to a positive threshold set in advance.

9 Claims, 7 Drawing Sheets

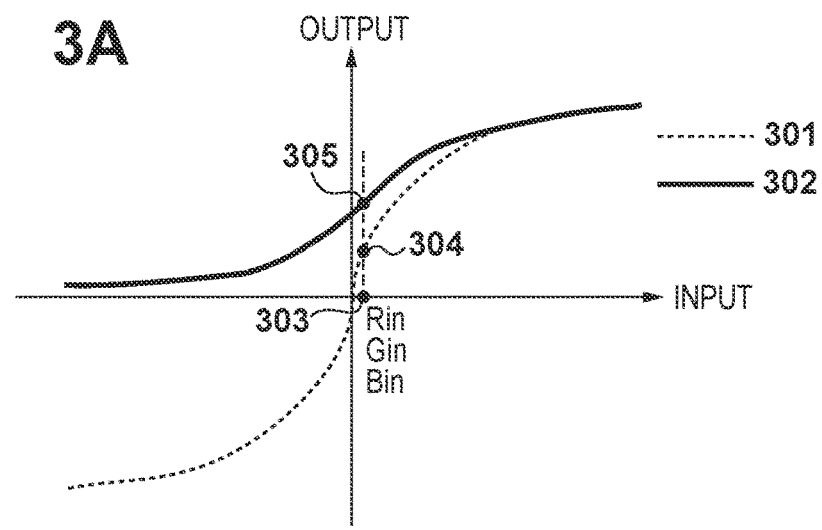
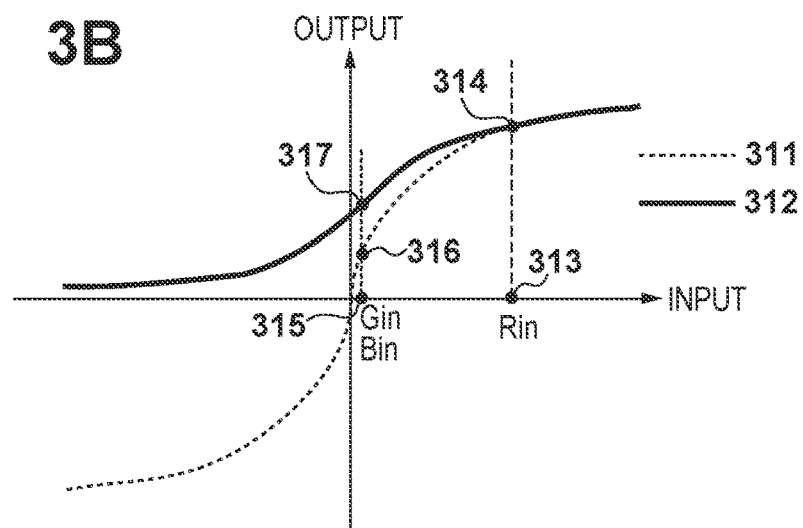
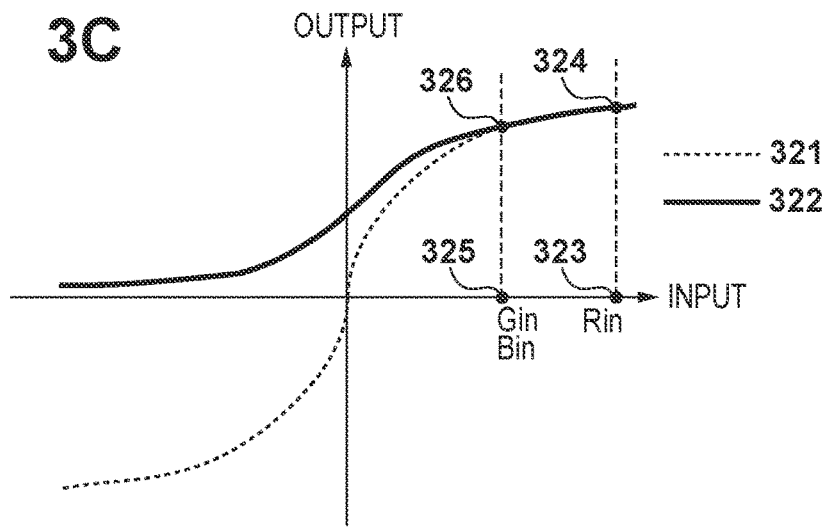

IMAGE PROCESSING APPARATUS AND IMAGE PROCESSING METHOD

BACKGROUND OF THE INVENTION

Field of the Invention

The present invention relates to an image processing apparatus and an image processing method.

Description of the Related Art

In recent years, in conjunction with the widening of a representable color gamut and the increase in display luminance for displays, HDR (high dynamic range) camera systems capable of reproducing a subject with tones and color gamut closer to its appearance have been proposed. Techniques for, when generating a video signal that corresponds to an HDR standard in a camera, optimizing each of signal processing for color difference output (color system signal processing) and signal processing for luminance output (luminance system signal processing) are known. For example, the document: Japanese Patent No. 3919389.

According to this document, there are cases where a difference in amplitude levels occurs between a luminance component separated by color system signal processing with respect to an input image, and a luminance component generated by luminance system signal processing. Furthermore, an ST.2084 gamma curve that complies with an HDR standard has a characteristic in that a rising edge for a dark portion is sharp in contrast to a gamma curve used by an SDR (standard dynamic range) camera system, and thus a difference in amplitude levels of luminance components is enhanced by a gamma conversion. As a result, when converting a video signal outputted from a camera to a color space for display in an HDR monitor, there are cases where a difference with the luminance amplitude level that occurred in the camera generates a pseudo signal in the color space for display, and the image quality is significantly impaired.

SUMMARY OF THE INVENTION

The present invention is made in consideration of this problem, and provides a technique for performing tone conversion processing respectively optimized for a luminance system and a color system, and suppressing a degradation of image quality.

According to an aspect of the invention, there is provided an image processing apparatus, comprising: a first generation unit configured to generate, from input image data, color component data of a predetermined color space for luminance output; a second generation unit configured to generate, from input image data, color component data of the predetermined color space for color difference output; a first conversion unit configured to convert a tone of each piece of the color component data for luminance output generated by the first generation unit; a second conversion unit configured to convert a tone of each piece of the color component data for color difference output generated by the second generation unit; a combining unit configured to combine each piece of the color component data obtained by the conversion by the first conversion unit and each piece of the color component data obtained by the conversion by the second conversion unit, and generate respective pieces of combined color component data; a separation unit configured to respectively separate luminance data and color difference data from each piece of color component data obtained by the combining unit; and a correction unit configured to correct a tone of each of the luminance data and color difference data obtained by the separation unit, wherein the second conversion unit has a conversion characteristic for outputting, for each piece of color component data, a non-negative value in a range, of negative infinity to a positive threshold set in advance, that input data can take.

By virtue of the present invention, it is possible to provide an image processing apparatus that suppresses a degradation of image quality by suppressing a signal level near 0 when performing tone conversion processing optimized for each of a luminance system and a color system.

Further features of the present invention will become apparent from the following description of exemplary embodiments (with reference to the attached drawings).

BRIEF DESCRIPTION OF THE DRAWINGS

FIGS. 3A to 3C are views illustrating input/output characteristics in second and third tone conversion units.

DESCRIPTION OF THE EMBODIMENTS

Hereinafter, embodiments according to the present invention is described in detail in accordance with the accompanying drawings.

First Embodiment

In the first embodiment, description is given below of an example in which the invention is applied to an image capturing apparatus typified by a digital camera.

Figure 1:
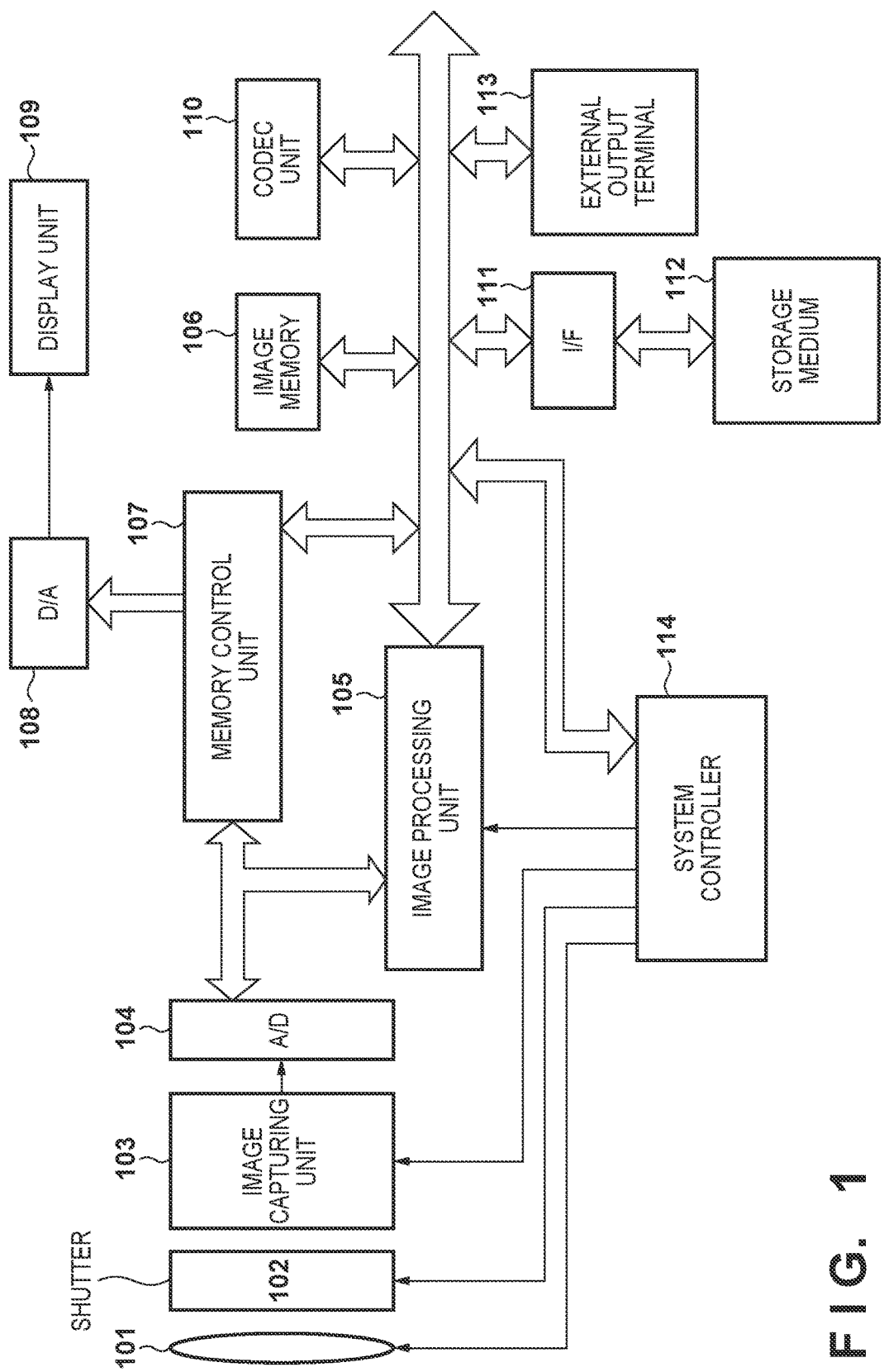
FIG. 1 is a block configuration diagram of a digital camera in accordance with embodiments.

FIG. 1 is a block configuration diagram of an image capturing apparatus according to the present embodiment. The image capturing apparatus has a system controller 114 that is responsible for control of the apparatus as a whole. The system controller 114 is configured by a CPU, a ROM (or a nonvolatile memory that can be rewritten) storing various parameters and a program that the CPU executes, and a RAM that is used as a work area of the CPU. In addition, the image capturing apparatus has a lens unit 101 that includes a zoom lens and a focus lens, a shutter 102 provided with an aperture function, an image capturing unit 103 configured by a CMOS element or the like for converting an optical image into an electrical signal, and an A/D converter 104 for converting an analog signal into a digital signal. In addition, the image capturing apparatus has an image processing unit 105 for performing various image processing such as white balance processing, demosaicing, noise reduction, outline emphasis, tone conversion, and color correction, on image data outputted from the A/D converter 104. In addition, the image capturing apparatus has an image memory 106, a memory control unit 107 for controlling the image memory 106, a D/A converter 108 for converting an inputted digital signal into an analog signal, a display unit 109 such as an LCD, and a codec unit 110 for compression encoding/decoding image data. The image capturing apparatus has an interface 111 for connecting a removable storage medium 112 such as a memory card or a hard disk for storing a captured image, and an output terminal 113 for outputting a video signal generated by the apparatus to an external device such as an HDR monitor.

Next, description is given regarding basic operations in the digital camera configured as described above. The image capturing unit 103 performs a photo-electrical conversion on light that enters via the lens unit 101 and the shutter 102, and supplies an obtained analog image signal to the A/D converter 104. The A/D converter 104 converts the analog image signal outputted from the image capturing unit 103 into a digital image signal (hereinafter may be referred to simply as image data), and supplies it to the image processing unit 105.

Note that, in the embodiment, because an HDR image is generated, it is assumed that each component generated by the A/D converter 104 has 10 bits of precision, for example. In addition, it is assumed that the processing systems in various processing units below are performed with the same number of bits. Note that it should be recognized that 10 bit precision is merely an example.

The image processing unit 105 generates, with respect to image data from the A/D converter 104 or image data from the memory control unit 107, a video signal for output to the codec unit 110 or the external output terminal 113. In addition, the image processing unit 105 writes image data obtained by processing to the image memory 106, via the memory control unit 107. The image memory 106 stores image data outputted from the image capturing unit 103, image data for displaying on the display unit 109, or the like.

In addition, the D/A converter 108 converts image data for display that is stored in the image memory 106 to an analog signal, and supplies the analog signal to the display unit 109. The display unit 109 is a display device such as an LCD, and displays a tone image according to the analog signal from the D/A converter 108.

The codec unit 110 performs compression encoding or decoding processing on image data under control by the system controller. For example, the codec unit 110 performs compression encoding on image data stored in the image memory 106, and stores generated encoded image data in the storage medium 112 via the interface 111. In addition, the codec unit 110 reads encoded image data stored in the storage medium 112 from the interface 111, performs decoding processing, and stores obtained image data in the image memory 106. Image data stored in the image memory 106 may be supplied to the display unit 109, or outputted as a video signal to an external output device such as an HDR monitor via the external output terminal 113.

Figure 2:
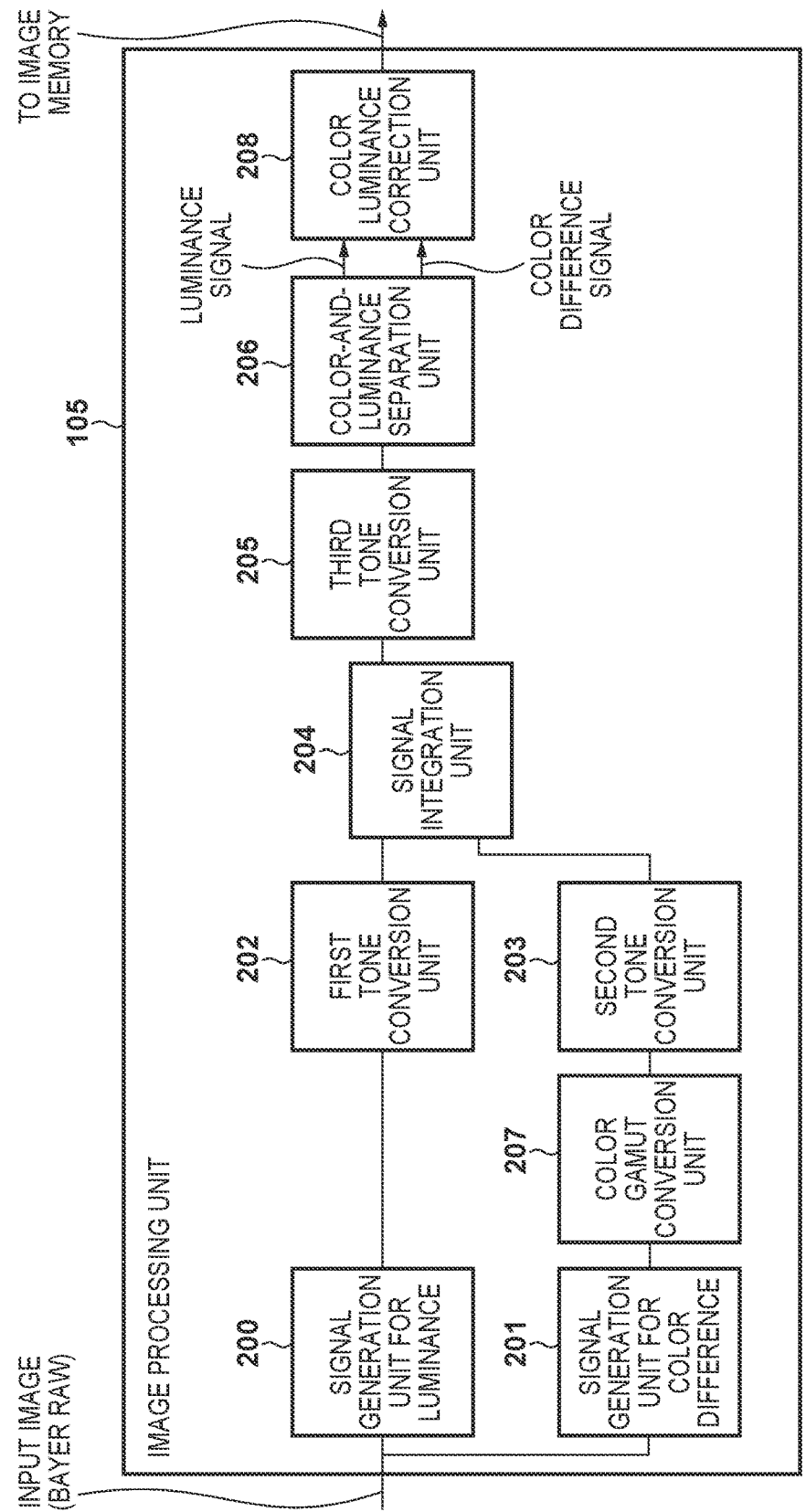
FIG. 2 is a block configuration diagram of an image processing unit in embodiments.

FIG. 2 is a block configuration diagram of the image processing unit 105 in the embodiment. With reference to the same figure below, constituent elements of the image processing unit 105 are described.

A signal generation unit for luminance 200 generates, from input image data (RAW image data having a Bayer arrangement), color component data of a predetermined color space suitable for a luminance signal. A signal generation unit for color difference 201 generates, from input image data, predetermined color component data suitable for a color difference signal. In this embodiment, the color space is assumed to be an RGB space. Consequently, the signal generation unit for luminance 200 and the signal generation unit for color difference 201 both generate R, G, and B color component data.

Here, a person's vision system has higher responsiveness to spatial frequencies than a change in brightness. Accordingly, the signal generation unit for luminance 200 performs demosaicing processing, noise reduction processing, outline compensation processing, or the like on image data outputted from the A/D converter 104 so that it includes more high-frequency components. In contrast, a person's vision system has lower responsiveness to spatial frequencies than a change in color. Accordingly, the signal generation unit for color difference 201 performs demosaicing processing, noise reduction processing, color correction processing, or the like on image data outputted from the A/D converter 104 so that degradation of image quality due to high-frequency components, such as aliasing due to noise or image processing, is reduced as much as possible.

A color gamut conversion unit 207 performs, on a signal after the color correction processing performed by the signal generation unit for color difference 201, a matrix computation for converting the signal to a BT.2020 color gamut.

A first tone conversion unit 202 performs a first tone conversion on output {Ry, Gy, By} from the signal generation unit for luminance 200. In addition, a second tone conversion unit 203 performs a second tone conversion on output {Rc, Gc, Bc} from the signal generation unit for color difference 201.

Description is given here regarding the tone conversion processing of the first tone conversion unit 202 and the second tone conversion unit 203.

Equation (1) through Equation (6) are computational equations in tone conversion processing for generating RGB signals R1y', G1y', B1y' for luminance by the first tone conversion unit 202, and generating RGB signals R1c', G1c', and B1c' for color difference by the second tone conversion unit 203. Letting x be an input, y be an output, and gain(y/x) of a conversion characteristic be f1(x), the tone conversion processing can be represented by y=x*f1(x).

$$R1c' = Rc * f1c(Rc) \tag{1}$$

$$R1y' = Ry * f1y(Ry) \tag{2}$$

$$G1c' = Gc * f1c(Gc) \tag{3}$$

$$G1y' = Gy * f1y(Gy) \tag{4}$$

$$B1c' = Bc * f1c(Bc) \tag{5}$$

$$B1y' = By * f1y(By) \tag{6}$$

A signal integration unit 204 is inputted with RGB data {R1y', G1y', B1y'} for luminance that is outputted from the first tone conversion unit 202, and RGB data {R1c', G1c', B1c'} for color difference that is outputted from the second tone conversion unit 203. The signal integration unit 204 integrates (or combines) these two lines of RGB data to generate one line of integrated (combined) RGB data {Rmix, Gmix, Bmix}. Specifically, the signal integration unit 204 obtains the integrated RGB data {Rmix, Gmix, Bmix} in accordance with the following equations (7) through (9).

$$Rmix = R1c' + a*(R1y'-R1c') + b*(G1y'-G1c') + c*(B1y'-B1c') \tag{7}$$

$$Gmix = G1c' + a*(R1y'-R1c') + b*(G1y'-G1c') + c*(B1y'-B1c') \tag{8}$$

$$B\text{mix}=B1c'+a*(R1y'-R1c')+b*(G1y'-G1c')+c*(B1y'-B1c') \quad (9)$$

In the above, the coefficients a, b, and c are real numbers that are set in advance, and have a relationship that a+b+c=1.

A third tone conversion unit 205 generates RGB data {R2', G2', B2'} by performing a third tone conversion indicated by the following equations (10) through (12) on the RGB data {Rmix, Gmix, Bmix} outputted from the signal integration unit 204. Letting x be an input, y be an output, and a coefficient of a conversion characteristic be f2(x), the conversion processing by the third tone conversion unit can be represented by y=x*f2(x).

$$R2'=R\text{mix}*f2(R\text{mix}) \quad (10)$$

$$G2'=G\text{mix}*f2(G\text{mix}) \quad (11)$$

$$B2'=B\text{mix}*f2(B\text{mix}) \quad (12)$$

A color-and-luminance separation unit 206 performs computations for the following equations (13) through (15) to separate luminance data Y and color difference data U, V from the RGB data {R2', G2', B2'} outputted from the third tone conversion unit 205. Note that the coefficients a, b, and c in the following equations (13) through (15) are the same values as the coefficients a, b, and c used in Equations (7) through (9).

$$Y=a*R2'+b*G2'+c*B2' \quad (13)$$

$$U=(1-c)*B2'-a*R2'-b*G2' \quad (14)$$

$$V=(1-a)*R2'-c*B2'-b*G2 \quad (15)$$

When a matrix including negative coefficients is multiplied to make a conversion to a high color gamut such as BT 2020, there are cases where the left sides of Equations (1), (3), and (5), which are used in conversion processing by the second tone conversion unit 203, are values in the vicinity of 0, including negative values. In such a case, a signal that integrates a color system signal and a luminance system signal, in other words the right side of Equations (7) through (9), fluctuates greatly near 0. As a result, there is a possibility that a degradation of image quality will occur by amplitude level differences of luminance components being enhanced by the third tone conversion unit 205.

Accordingly, in the present embodiment, the second tone conversion unit 203 makes it so that values near 0 do not occur. As a result, it values near 0 tend not to occur even for an integrated signal, and as a result, it is possible to suppress a degradation of image quality, even in the third tone conversion unit 205, because signal values near 0 are not amplified. FIG. 7 is used to give a description regarding specific details for this.

Figure 7A:
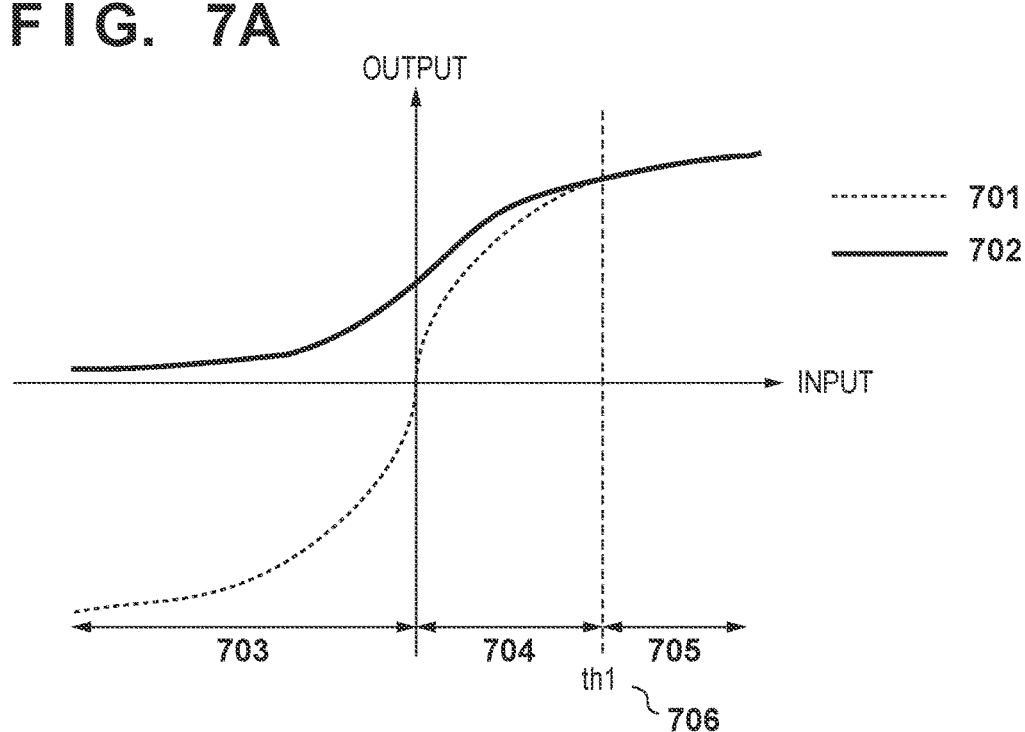
FIGS. 7A and 7B are views illustrating characteristics in second and third tone conversion units.

With reference to FIG. 7, description is given for a tone conversion characteristic in accordance with the second tone conversion unit 203. FIG. 7A illustrates a coordinate space for a tone conversion, wherein the horizontal axis indicates input data values before a tone conversion, and the vertical axis indicates output data values after a tone conversion. The horizontal axis indicates Rc, Gc, and Bc for Equations (1), (3), and (5), and the vertical axis corresponds to R1c', G1c', and B1c' for the same equations.

Note that a reference numeral 701 indicated by a dashed line indicates a tone conversion characteristic in accordance with BT 2020 (hereinafter referred to as a conventional tone conversion characteristic), and a reference numeral 702 indicated by a solid line indicates the tone conversion characteristic in the present embodiment. As shown in the figure, the tone conversion characteristic 702 in the embodiment generates a non-negative value as a conversion result, with respect to, in a range that input data can take, a range from negative infinity to a threshold th1.

Figure 7B:
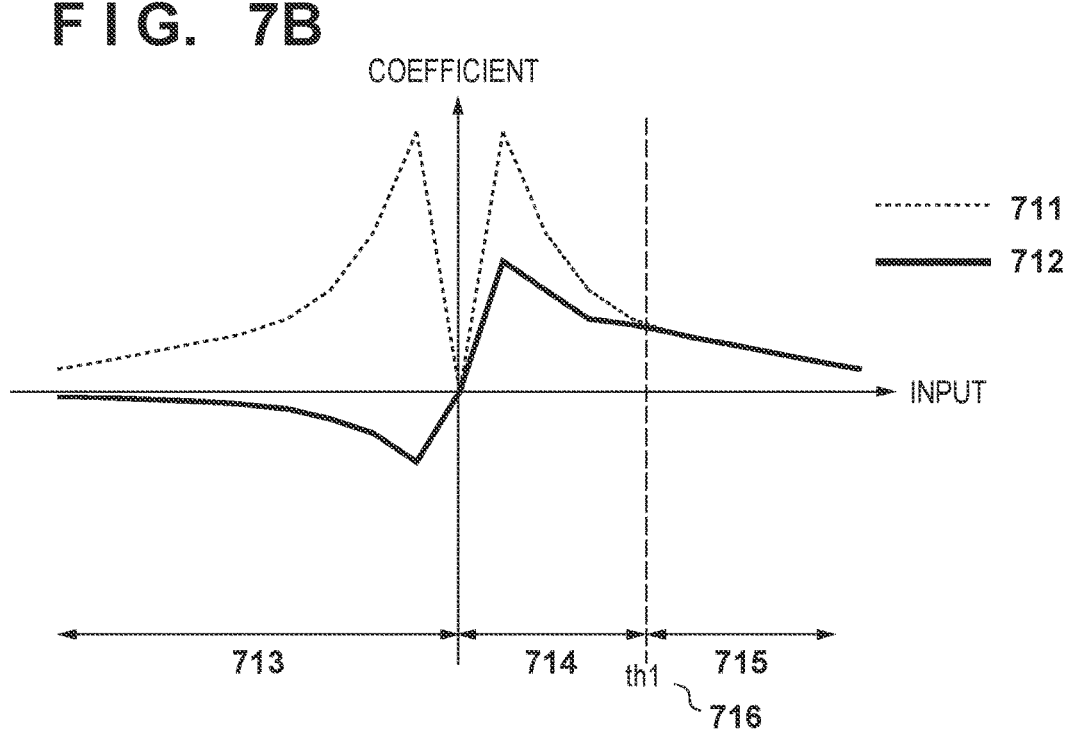

FIG. 7B illustrates a coordinate space that represents the gain (y/x) of the tone conversion characteristic, and corresponds to f1c( ) of Equations (1), (3), and (5). Similarly to FIG. 7A, a reference numeral 711 indicates a gain curve that represents a conventional tone conversion characteristic, and a reference numeral 712 indicates a gain curve that represents a tone conversion characteristic of the present embodiment.

For this tone conversion characteristic, description is given across three sections: a section 715 in which the input x is larger than the threshold th1 (a reference numeral 716 of FIG. 7B) set in advance, a positive section 714 where the input x is less than or equal to the threshold th1, and a section 713 where the input x is a negative value. Note that the threshold th1 is a parameter that can be set in view of a correction amount for a color luminance correction that is described later, and a degree of degradation of image quality described above.

Firstly, for the section 715, there is no difference with the conventional tone conversion characteristic in this section. Next, description is given for the section 714. Because this is a section where the coefficient is large in the case of the conventional tone conversion characteristic, a coefficient 712 is made to be smaller than a coefficient 711. Next, description is given for the section 713. Similarly to the section 713 and the section 714, this is a section where the coefficient becomes large in the case of a conventional tone conversion characteristic, but a degradation of image quality also gets larger by the signal values being amplified on the negative side in embodiments. Accordingly, for the section 713, the coefficient 712 is made smaller than the coefficient 711, and the coefficient 712 is also made to be a negative value to thereby achieve an output of a positive value due to a multiplication with an input value (a negative value). As a result, a negative signal ceases to occur for the signal value after integration, and it is possible to suppress a degradation of image quality.

Note that, for the sections 713 and 714, because an output value becomes greatly positive for a conventional tone conversion characteristic, for an integrated signal, the signal value of a low-luminance portion will increase (a dark portion will become brighter), and the chroma of the low-luminance portion will decrease.

This mechanism is described with reference to FIGS. 3A to 3C. FIGS. 3A to 3C represent input-output characteristics similar to those of FIGS. 7A and 7B, where a dotted line indicates a conventional input-output characteristic, and a solid line indicates an input-output characteristic of the present embodiment.

Firstly, using FIG. 3A, description is given of a case where the input signals Rin, Gin, and Bin for all RGB channels are low-luminance signals close to 0. The inputted input signals Rin, Gin, and Bin for all components being close to 0 should mean a low-luminance signal, but when a tone conversion is performed by a characteristic 302, the input values thereof become the values indicated by a reference numeral 305, and the signal values of all channels become higher than values for the case where a tone conversion is performed by the characteristic 301 (reference numeral 304). In other words, pixels or regions that were a dark portion get brighter.

Next, using FIG. 3B, description is given for a case where an input signal is a low-luminance high-chroma signal. A low-luminance high-chroma signal is a case where values of each color component are comparatively small, and a difference between at least two of the color components is a certain amount or more. Shown in the figure is an example in which, out of the input signals, the Rin signal has the value of a reference numeral 313, and the other Gin and Bin signals are at the reference numeral 315. From the input signals, the same output value 314 is obtained for the Rin signal regardless of which characteristic out of characteristics 311 and 312 the conversion is performed by, but the value of a reference numeral 317 is obtained for Gin and Bin when a tone conversion is performed by the characteristic 312, the value of the reference numeral 317 being a higher value than that of a reference numeral 316, which indicates a result of a tone conversion by the conventional characteristic 311. Accordingly, although it was originally a low-luminance high-chroma signal, when a tone conversion by the characteristic 312 is performed, a low-luminance signal increases, the difference between R, G, and B decreases, and the chroma decreases.

Finally, using FIG. 3C, description is given for a case where an input signal is a high-luminance high-chroma signal. A high-luminance high-chroma signal is a case where values of each color component are comparatively large and a difference between at least two components is a certain amount or more. Shown in the figure is an example in which, out of the input signals, the Rin signal has the value of a reference numeral 323, and the other Gin and Bin signals are at the reference numeral 325. In the case shown graphically, because the same output values are obtained regardless with which characteristic of the characteristics 321 and 322 a conversion is performed by, the output signal does not change regardless of which tone conversion characteristic is used.

It is a color luminance correction processing unit 208 in the embodiment that performs processing for correcting color and luminance, which are produced by changing the tone conversion characteristic in this fashion, to an original color. The following equations (16) through (18) indicate examples of processing by the color luminance correction processing unit 208.

$$Y' = Y*Gy(Y) \quad (16)$$

$$U' = U*Gc(Y) \quad (17)$$

$$V' = V*Gc(Y) \quad (18)$$

Figure 4A:
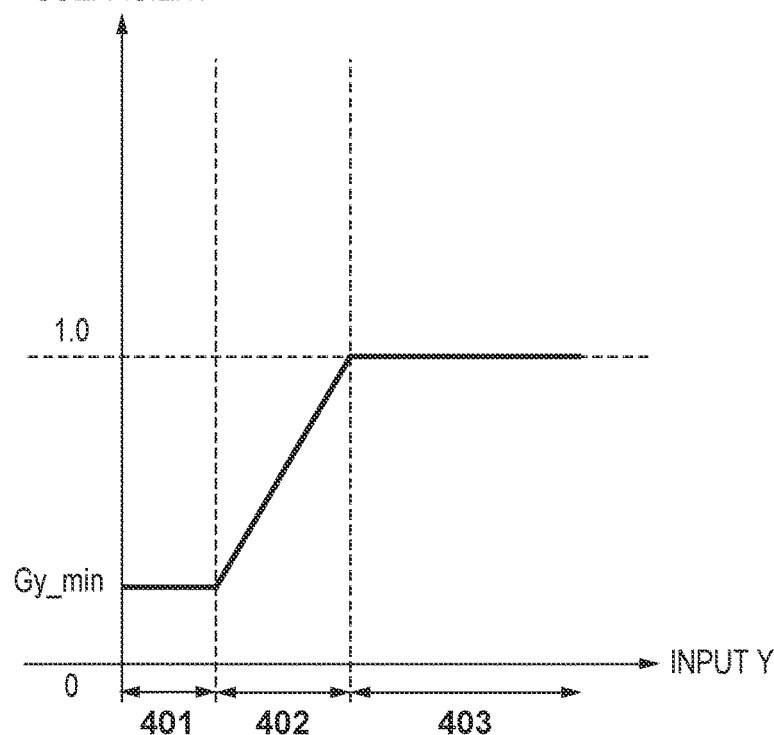
FIGS. 4A and 4B are views for describing a correction process by a color luminance correction unit in a first embodiment.
Figure 4B:
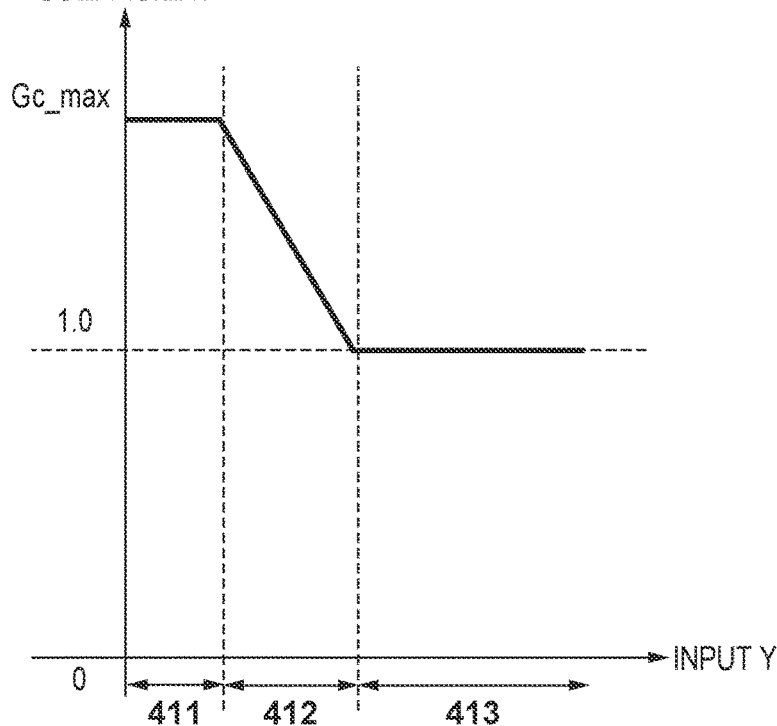

Detailed processing for these equations is described using FIGS. 4A and 4B. FIG. 4A illustrates an input-output characteristic for luminance correction processing. The horizontal axis corresponds to Y (luminance) of Equation (16), and the vertical axis corresponds to Gy(Y) of the same equation. Note that it is possible to generate the luminance signal by an equation similar to Equation (13), and it is assumed that a:b:c=3:6:1 or the like is used as a composition ratio for the equation.

As described above, because the signal value on a low luminance side increases by performing the second tone conversion, with respect to a section 401 which is for a low-luminance signal from luminance 0 to a predetermined threshold, a gain less than 1.0 is set so that the luminance level ends up being small. Note that although Gy_min is set as a lower limit value, it is assumed that the gain can be adjusted in a range of 0.0 to 1.0 in view of a luminance level of the output signal.

In contrast, a gain of 1.0 is set for a section 403 which is a high-luminance signal so that its luminance level does not change from a conventional case, and a gain that increases from Gy_min to 1.0 together with change from low luminance to high luminance is set for a section 402 which is an intermediate luminance range which is from a low luminance to a high luminance.

A correction similar to that for the luminance signal is performed for the color signal. FIG. 4B is an input-output characteristic for color correction processing, where horizontal corresponds to Y (luminance) of Equations (17) and (18), and the vertical axis corresponds to Gc(Y) of the same equations.

As described above, since the chroma of a low luminance side decreases by the second tone conversion being performed, a gain of 1.0 or more so that chroma increases is set for a section 411 that is a low-luminance signal having a luminance of 0 or more. Note that although Gc_max is set as an upper limit value, it is assumed that the gain can be adjusted in view of the chroma of the output signal.

In contrast, a gain of 1.0 is set for a section 413 which is a high-luminance signal so that its chroma does not change from a conventional case, and a gain that decreases from Gc_max to 1.0 together with change from low luminance to high luminance is set for a section 412 which is an intermediate luminance range which is from a low luminance to a high luminance.

By performing such processing, it is possible to correct, by the color luminance correction processing unit 208, change of color and luminance due to changing the second tone conversion characteristic. The luminance and color difference signals outputted from the color luminance correction processing unit 208 are, via the image memory or the codec unit, supplied to the HDR monitor from the external output terminal, and displayed.

As described above, by virtue of the image processing apparatus of the present embodiment, it is possible to suppress a degradation of image quality of an output image by performing a tone conversion characteristic so that a value near 0 does not occur in a second tone conversion output.

In addition, the processing described above may be applied to third tone conversion processing. Even if the processing described above is performed, there is the possibility that a signal value near 0 will occur for an integrated RGB signal depending on the content of the processing by the signal generation unit for luminance 200. For example, when an outline on an undershoot side is enhanced by outline compensation processing, a signal near 0 occurs when a correction signal is subtracted from the original signal value, and as a result a signal value near 0 occurs for the integrated signal value.

Accordingly, by performing processing similar to the second tone conversion even in third tone conversion processing, it is possible to make it so that a signal near 0 tends not to be multiplied by a large coefficient. Note that, by making so that output values increase on a positive side in comparison to a conventional tone conversion characteristic, a low-luminance signal value increasing and the chroma of a low-luminance high-chroma signal decreasing occur in a similar fashion, and, in the color luminance correction unit 208, the luminance and color are corrected using Equations (16) through (18) and characteristics illustrated in FIGS. 4A and 4B.

Furthermore, although description is given here regarding processing respectively corresponding to the second tone conversion characteristic and the third tone conversion characteristic, processing may be performed for both of the second tone conversion characteristic and the third tone conversion characteristic. Note that, even if processing is performing only with respect to third tone conversion processing, it is possible to achieve a certain effect by suppressing signal values near 0 from occurring for integrated signal values.

Note that configuration is taken so as to not perform the processing described above on the first tone conversion characteristic, because the tone of a low-luminance signal is compressed to thereby reduce the contrast of a low luminance side when this processing is performed on the first tone conversion characteristic. In addition, an input-output characteristic for the first tone conversion characteristic and the second tone conversion characteristic in the section 715 of FIG. 7B (a section for an input signal having a high signal value) may be the same characteristic.

In the present embodiment, a color space in which signal generation processing for luminance and signal generation processing for color difference is performed is given as RGB, but processing may be performed in another color space of a mixed-color type color system such as XYZ or LMS. In addition, a color space in which the color-and-luminance separation after the tone conversion processing is performed is given as YUV, but processing may be performing in another color space of a color-and-luminance separation form, such as ICtCp.

Note that, in the embodiment, the hardware configuration of the image processing unit 105 was described as having the configuration of FIG. 2, but each processing unit illustrated in FIG. 2 may be realized by a CPU and a program executed by the CPU. In addition, in the foregoing embodiment, conversion processing corresponding to a tone conversion or the like was described using equations, but these may be realized with a lookup table. Corresponding points are similar even in a second embodiment described below.

Second Embodiment

Description is given below regarding a digital camera in a second embodiment of the present invention. The second embodiment differs to the first embodiment in the configuration of the image processing unit 105. Below, using FIG. 5, description is given in detail regarding processing details of the image processing unit 105 in the second embodiment.

Figure 5:
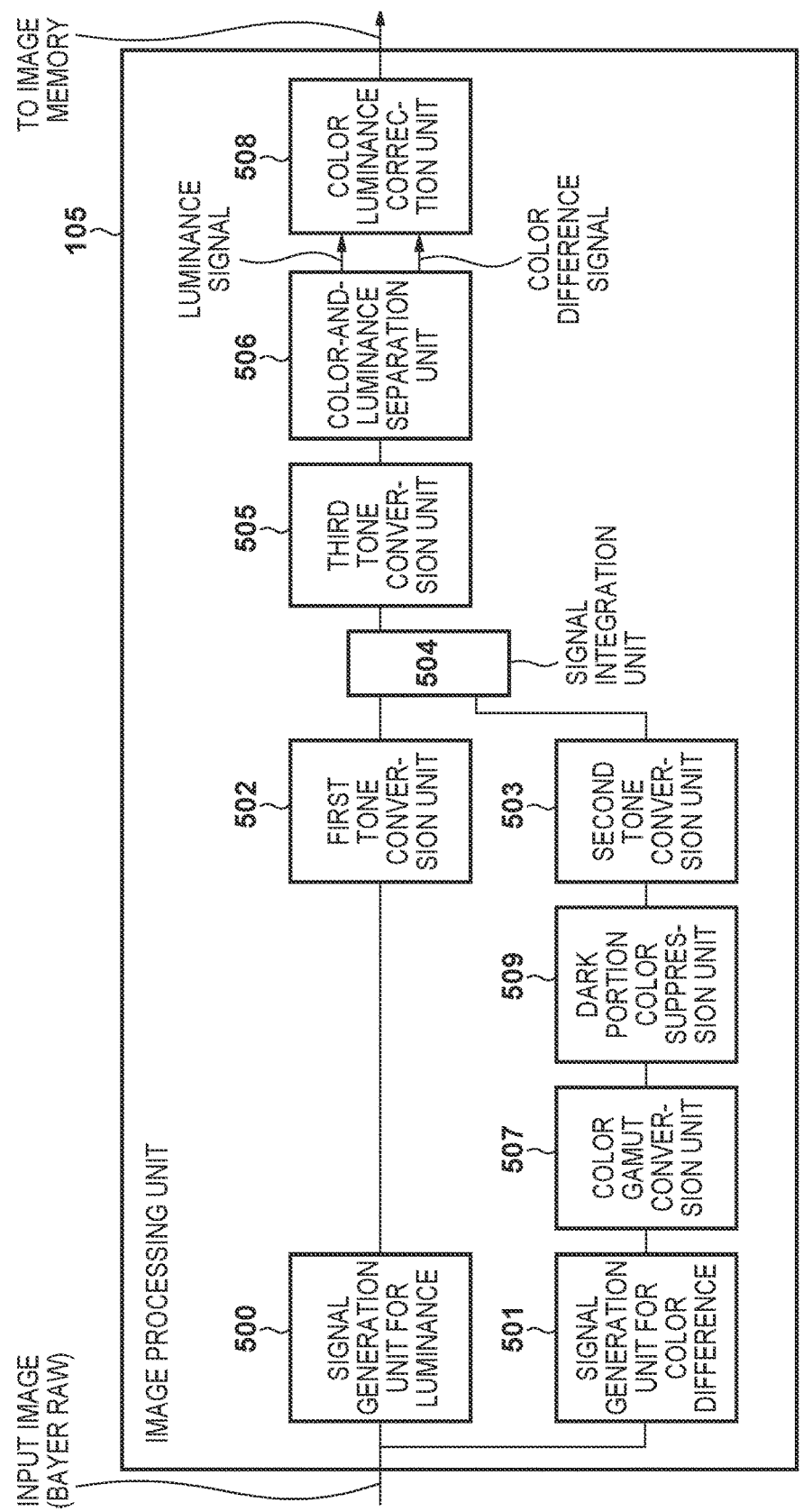
FIG. 5 is a block configuration diagram of an image processing unit of a second embodiment.

In FIG. 5, a signal generation unit for luminance 500 generates RGB signal components suitable for a luminance signal from the input image. A signal generation unit for color difference 501 generates RGB signal components suitable for a color difference signal from the input image. A color conversion unit 507 performs, on a signal after the color correction processing performed by the signal generation unit for color difference 501, a matrix computation for converting the signal to a color gamut such as BT.2020. A first tone conversion unit 502 performs a first tone conversion on output {Ry, Gy, By} from the signal generation unit for luminance 500. A second tone conversion unit 503 performs a second tone conversion. A signal integration unit 504 integrates two lines of RGB signals for a luminance signal and a color difference signal that are outputted from the first tone conversion unit 502 and the second tone conversion unit 503, to generate a one line RGB signal. A third tone conversion unit 505 performs a third tone conversion on an integrated signal. A color-and-luminance separation unit 506 separates a luminance signal and a color difference signal from the RGB signal outputted from the third tone conversion unit 505. A color luminance correction unit 508 performs corrections on the luminance signal and the color signal generated by the color-and-luminance separation unit 506.

If it is assumed that the second tone conversion unit 503 and the color luminance correction unit 508 in the second embodiment perform processing similar to that of the second tone conversion unit 203 and the color luminance correction unit 208 in the first embodiment, a gain for raising the chroma of a chromatic color signal on a low luminance side that was reduced by the second tone conversion unit 503 is applied by the color luminance correction unit 508. However, by gain being applied even to a color difference signal generated by sensor noise, the color difference of an achromatic color signal on a low luminance side also increases, and, as a result, coloring (color casting) unfortunately occurs for an achromatic color signal on a low luminance side. Accordingly, in the second embodiment, processing so that RGB having small values approach the same value is performed by a dark portion color suppression unit 509 before performing a conversion by the second tone conversion unit 503.

Processing performed by the dark portion color suppression unit 509 is in accordance with the following equations (19) and (20).

$$U' = U * Gc(Y) \quad (19)$$

$$V' = V * Gc(Y) \quad (20)$$

Figure 6:
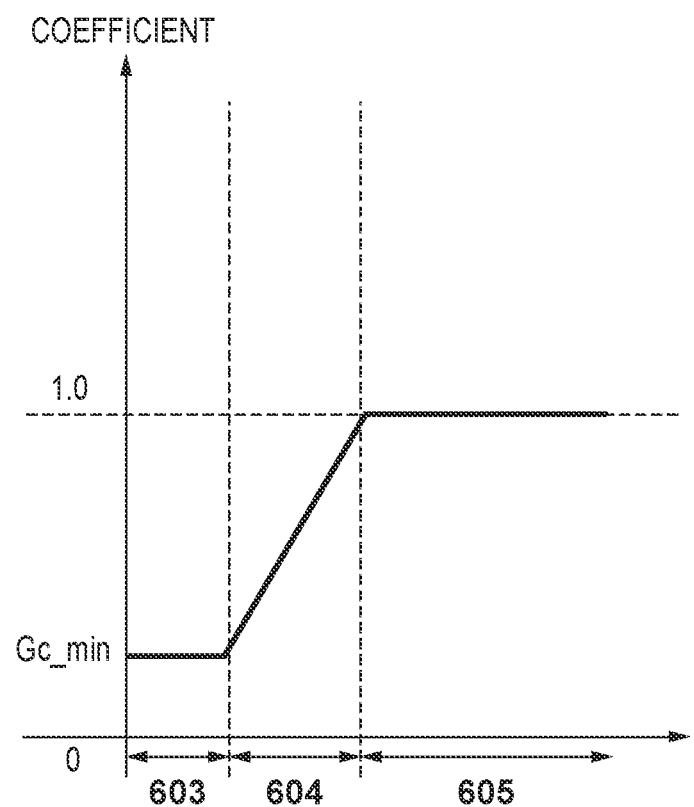
FIG. 6 is a view for describing processing of a dark portion color suppression unit in the second embodiment.

In addition, the relationship between Equations (19) and (20) is described using FIG. 6. The horizontal axis of FIG. 6 corresponds to Y (luminance) of the equations, and the ordinate corresponds to Gc(Y) of the equations. Note that it is possible to generate the luminance signal by an equation similar to Equation (13), and it is assumed that a:b:c=3:6:1 or the like is used as a composition ratio for the equation. A gain less than 1.0, so that the luminance level decreases, is applied to a section 603 which is a low-luminance signal. Note that although Gc_min is set as a lower limit value, it is assumed that the gain can be adjusted in a range of 0.0 to 1.0 in view of a level of coloring of a dark portion. In contrast, a gain of 1.0, to maintain the color difference, is applied to a section 605 which is a high-luminance signal because the tone conversion characteristic does not change from a conventional characteristic, and a gain that increases from Gc_min to 1.0 together with change from low luminance to high luminance is applied to a section 604 which is an intermediate luminance range between low luminance and high luminance.

Note that, although the tone conversion characteristic in the second tone conversion processing was given as an example of a reason why coloring of a dark portion occurs, it may be a case of performing a tone conversion characteristic in conversion processing by the third tone conversion unit 505, or a case of performing both the conversion characteristic of the second tone conversion unit 503 and the third tone conversion unit 505. Note that a certain effect can be achieved even in the case of performing only the third tone conversion characteristic.

Furthermore, similarly to in the first embodiment, a color space in which signal generation processing for luminance and signal generation processing for color difference is performed is given as RGB, but processing may be performed in another color space of a mixed-color type color system such as XYZ or LMS. In addition, a color space in which the color-and-luminance separation after the tone conversion processing is performed is given as YUV, but processing may be performing in another color space of a color-and-luminance separation form, such as ICtCp.

Other Embodiments

Embodiment(s) of the present invention can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-175798, filed Sep. 13, 2017, which is hereby incorporated by reference herein in its entirety.

What is claimed is:

1. An image processing apparatus, comprising:
a first generation unit configured to generate, from input image data, color component data of a predetermined color space for luminance output;
a second generation unit configured to generate, from input image data, color component data of the predetermined color space for color difference output;
a first conversion unit configured to convert a tone of each piece of the color component data for luminance output generated by the first generation unit;
a second conversion unit configured to convert a tone of each piece of the color component data for color difference output generated by the second generation unit;
a combining unit configured to combine each piece of the color component data obtained by the conversion by the first conversion unit and each piece of the color component data obtained by the conversion by the second conversion unit, and generate respective pieces of combined color component data;
a separation unit configured to respectively separate luminance data and color difference data from each piece of color component data obtained by the combining unit; and
a correction unit configured to correct a tone of each of the luminance data and color difference data obtained by the separation unit,
wherein the second conversion unit has a conversion characteristic for outputting, for each piece of color component data, a non-negative value in a range, of negative infinity to a positive threshold set in advance, that input data can take.

2. The apparatus according to claim 1, wherein the correction unit has, for the luminance data, a gain that is positive and smaller than a value indicated by input data in a range from a luminance of 0 to a positive first threshold set in advance, in a range that the input data can take, and
has, for color difference data, a gain that is positive and larger than a value indicated by input data in a range from a luminance of 0 to the first threshold, in a range that the input data can take.

3. The apparatus according to claim 2, wherein the correction unit, for luminance data and color difference data, has a gain of 1 for outputting a value indicated by input data, for input data exceeding the threshold.

4. The apparatus according to claim 1, further comprising an image capturing unit configured to generate the input image.

5. An image processing method, comprising:
first generating, from input image data, color component data of a predetermined color space for luminance output;
second generating, from input image data, color component data of the predetermined color space for color difference output;
first converting a tone of each piece of the color component data for luminance output generated by the first generating;
second converting a tone of each piece of the color component data for color difference output generated by the second generating;
combining each piece of the color component data obtained by the conversion by the first converting and each piece of the color component data obtained by the conversion by the second converting, and generating respective pieces of combined color component data;
respectively separating luminance data and color difference data from each piece of color component data obtained by the combining; and
correcting a tone of each of piece of the luminance data and color difference data obtained by the separating,
wherein the second converting has a conversion characteristic for outputting, for each piece of color component data, a non-negative value in a range, of negative infinity to a positive threshold set in advance, that input data can take.

6. A non-transitory computer-readable storage medium storing a program which, when read and executed by a computer, causes the computer to perform the steps of an image processing method, the method comprising:
first generating, from input image data, color component data of a predetermined color space for luminance output;
second generating, from input image data, color component data of the predetermined color space for color difference output;
first converting a tone of each piece of the color component data for luminance output generated by the first generating;
second converting a tone of each piece of the color component data for color difference output generated by the second generating;
combining each piece of the color component data obtained by the conversion by the first converting and each piece of the color component data obtained by the conversion by the second converting, and generating respective pieces of combined color component data;

respectively separating luminance data and color difference data from each piece of color component data obtained by the combining; and correcting a tone of each of the luminance data and color difference data obtained by the separating, wherein the second converting has a conversion characteristic for outputting, for each piece of color component data, a non-negative value in a range, of negative infinity to a positive threshold set in advance, that input data can take.

7. An image processing apparatus, comprising:

a first generation unit configured to generate, from input image data, color component data of a predetermined color space for luminance output;

a second generation unit configured to generate, from input image data, color component data of the predetermined color space for color difference output;

a first conversion unit configured to convert a tone of each piece of the color component data for luminance output generated by the first generation unit;

a second conversion unit configured to convert a tone of each piece of the color component data for color difference output generated by the second generation unit;

a combining unit configured to combine each piece of the color component data obtained by the conversion by the first conversion unit and each piece of the color component data obtained by the conversion by the second conversion unit, and generate respective pieces of combined color component data;

a third conversion unit configured to convert a tone of each piece of color component data obtained by the combining unit, wherein at least one of the second conversion unit and the third conversion unit has a conversion characteristic for outputting, for each piece of color component data, a non-negative value in a range, of negative infinity to a positive threshold set in advance, that input data can take.

8. An image processing method, comprising:

first generating, from input image data, color component data of a predetermined color space for luminance output;

second generating, from input image data, color component data of the predetermined color space for color difference output;

first converting a tone of each piece of the color component data for luminance output generated by the first generating;

second converting a tone of each piece of the color component data for color difference output generated by the second generating;

combining each piece of the color component data obtained by the conversion by the first converting and each piece of the color component data obtained by the conversion by the second converting, and generating respective pieces of combined color component data;

third converting a tone of each piece of color component data obtained by the combining, wherein at least one of the second converting and the third converting has a conversion characteristic for outputting, for each piece of color component data, a non-negative value in a range, of negative infinity to a positive threshold set in advance, that input data can take.

9. A non-transitory computer-readable storage medium storing a program which, when read and executed by a computer, causes the computer to perform the steps of an image processing method, the method comprising:

first generating, from input image data, color component data of a predetermined color space for luminance output;

second generating, from input image data, color component data of the predetermined color space for color difference output;

first converting a tone of each piece of the color component data for luminance output generated by the first generating;

second converting a tone of each piece of the color component data for color difference output generated by the second generating;

combining each piece of the color component data obtained by the conversion by the first converting and each piece of the color component data obtained by the conversion by the second converting, and generating respective pieces of combined color component data;

third converting a tone of each piece of color component data obtained by the combining, wherein at least one of the second converting and the third converting has a conversion characteristic for outputting, for each piece of color component data, a non-negative value in a range, of negative infinity to a positive threshold set in advance, that input data can take.

* * * * *